(12) United States Patent
Halon (10) Patent No.: US 9,732,548 B1
(45) Date of Patent: Aug. 15, 2017

(54) MODULAR SAFE ROOM

(71) Applicant: Catherine M. Halon, Stuart, FL (US)

(72) Inventor: Catherine M. Halon, Stuart, FL (US)

( * ) Notice: Subject to any disclaimer, the term of this patent is extended or adjusted under 35 U.S.C. 154(b) by 0 days.

(21) Appl. No.: 15/133,140

(22) Filed: Apr. 19, 2016

(51) Int. Cl.
| | |
|---|---|
| *E05G 1/024* | (2006.01) |
| *E04H 9/06* | (2006.01) |
| *E04H 9/02* | (2006.01) |
| *E04H 9/14* | (2006.01) |
| *E06B 5/11* | (2006.01) |
| *E06B 5/12* | (2006.01) |
| *E04H 1/00* | (2006.01) |
| *E04B 1/343* | (2006.01) |
| *F24F 7/007* | (2006.01) |
| *E05G 1/00* | (2006.01) |
| *B29C 65/08* | (2006.01) |
| *B29C 65/00* | (2006.01) |
| *B29K 69/00* | (2006.01) |
| *B29L 31/00* | (2006.01) |

(52) U.S. Cl.
CPC .......... *E05G 1/024* (2013.01); *E04B 1/34321* (2013.01); *E04H 1/005* (2013.01); *E04H 9/029* (2013.01); *E04H 9/06* (2013.01); *E04H 9/14* (2013.01); *E05G 1/00* (2013.01); *E06B 5/11* (2013.01); *E06B 5/12* (2013.01); *F24F 7/007* (2013.01); *B29C 65/08* (2013.01); *B29C 66/12423* (2013.01); *B29K 2069/00* (2013.01); *B29L 2031/776* (2013.01)

(58) Field of Classification Search
CPC .. E05G 1/00; E05G 1/02; E05G 1/024; E05G 1/026
See application file for complete search history.

(56) References Cited

U.S. PATENT DOCUMENTS

| | | | | |
|---|---|---|---|---|
| 4,388,874 A * | 6/1983 | Stone | ...................... | E05G 1/024 109/79 |
| 4,389,948 A * | 6/1983 | Sands | ...................... | E05G 1/024 109/79 |
| 4,559,881 A * | 12/1985 | Lankard | .................. | B28B 23/00 106/644 |
| 5,386,788 A * | 2/1995 | Linker | .................... | E05G 1/024 109/58 |
| 6,003,271 A * | 12/1999 | Boyer | ..................... | E05G 1/024 52/745.13 |
| 6,786,009 B1 * | 9/2004 | McGunn | ................. | A47B 47/03 312/263 |
| 8,640,409 B2 * | 2/2014 | Thomson | ................. | E04H 9/14 52/251 |
| 2009/0071957 A1 * | 3/2009 | Chang | ..................... | E05G 1/024 220/4.33 |
| 2010/0282136 A1 * | 11/2010 | Stanley | ................... | E05G 1/005 109/64 |
| 2013/0276679 A1 * | 10/2013 | Kroeplien | ................ | A47F 7/00 109/73 |

* cited by examiner

*Primary Examiner* — Christopher Boswell (74) *Attorney, Agent, or Firm* — Nancy J. Flint, Esq.; Nancy J. Flint, Attorney At Law (57) ABSTRACT

A modular safe room that can be installed in an enclosed space in existing homes, buildings and other occupied structures is disclosed. The modular safe room is constructed from three separate elements and can be sized to fit the desired space. The elements making up the modular safe room comprise tongue and slot elements for attachment to each other.

17 Claims, 12 Drawing Sheets

MODULAR SAFE ROOM

FIELD OF THE INVENTION

The invention relates to a modular safe room that can be purchased locally and installed easily by a homeowner in an enclosed space in existing homes, buildings and other occupied structures. The modular safe room is constructed from three separate elements and can be sized to fit the desired space. The elements making up the modular safe room comprise tongue and slot elements for attachment to each other.

BACKGROUND OF THE INVENTION

There are many occasions where residents of a structure, such as a home, may want to seek shelter or refuge. For example, catastrophic weather events such as tornadoes often cause injury and death to residents while inside their homes. Home invasions are also times where residents of homes may want to seek shelter. The majority of homes do not include "safe" rooms designed to provide refuge for residents during these types of events.

Most individuals and families have few choices in obtaining safe shelter while inside their homes. Underground shelters are expensive to build and maintain, and above ground shelters often require expensive fabrication and construction costs. Additionally, underground shelters are typically not accessible to the handicapped and elderly, and many properties are not amenable to underground construction. As a result, safe rooms are often configured for above-ground placement. Typically, the costs of adding a safe room to an existing structure is prohibitive.

SUMMARY OF THE INVENTION

The modular safe room of the invention provides a shelter that can be easily installed by a homeowner in existing homes and buildings without requiring additional space or construction to accommodate the modular safe room. The modular safe room is easily assembled and adapted to accommodate a variety of existing spaces in the home or building.

According to one embodiment of the invention, a modular safe room is constructed from three separate components and can be sized to fit a desired space. The first component is a planar wall/floor panel; the second component is a right-angle frame element; and the third component is a cubic corner piece. A plurality of wall/floor panels are attached in side-by-side relationship to form walls, a floor and a ceiling. The attached wall/floor panels are then connected in a spatial relationship to form the modular safe room with the frame elements and the cubic corner elements to maintain the components in sturdy connection.

Each wall/floor panel comprises an outer surface, an inner surface; and four edges between the outer surface and inner surface, where each edge comprises a tongue element and a slot. Each wall/floor panel has a planar orientation. Each frame element comprises two elements disposed at a right angle, each element having an inner surface and an outer surface; an attachment edge, a top edge and two abutment edges between the outer surface and inner surface, where each attachment edge comprises a tongue element and a slot. Each corner piece is made of a substantially cubical element that fits into a space formed by the abutment of three frame edges. The tongue elements of the wall/floor panels and the frame elements are of substantially the same size and configuration. The slots of the wall/floor panels and the frame elements are of substantially the same size and configuration to receive the tongue elements. The modular safe room can be assembled in various sizes and shapes by attaching the wall/floor panels as desired by the owner.

A notch is formed in the edge of each wall/floor panel and frame element adjacent to each side of each slot. The notch provides the ability of the wall/floor panel and the frame element to deform for insertion of the tongue element into the slot. Once the tongue element is inserted into the slot, the wall/floor panel and frame element returns to its original condition, thus preventing the tongue element from being removed from the slot.

According to one embodiment of the invention, the modular safe room comprises one or more air vents and an electricity source. In one embodiment, air circulation within the modular safe room is provided by a fan. In one embodiment, the modular safe room comprises a light source. In one embodiment, the modular safe room comprises one or more doors for entrance and egress. In one embodiment, one or more air vents are disposed in a door.

BRIEF DESCRIPTION OF THE DRAWINGS

The invention is further described with respect to the drawings, in which like or corresponding parts are denoted by like or corresponding reference numerals.

DETAILED DESCRIPTION OF THE INVENTION

The modular safe room of the invention provides a shelter that can be installed in existing homes and buildings without requiring additional space or construction to accommodate the modular safe room. The modular safe room is easily assembled and adapted to accommodate a variety of existing spaces in the home or building.

According to one embodiment of the invention, a modular safe room is constructed from three separate components and can be sized to fit a desired space. The first component is a planar wall/floor panel; the second component is a right-angle frame element; and the third component is a cubic corner piece. A plurality of wall/floor panels are attached in side-by-side relationship to form walls, a floor and a ceiling. The attached wall/floor panels are then connected in a spatial relationship to form the modular safe room with the frame elements and the cubic corner elements to maintain the components in sturdy connection.

Each wall/floor panel comprises an outer surface, an inner surface; and four edges, where each edge comprises a tongue element and a slot. Each wall/floor panel has a planar orientation. Each frame element comprises two elements disposed at a right angle to each other, each element having an inner surface and an outer surface; an attachment edge and two abutment edges, where each attachment edge comprises a tongue element and a slot. Each corner piece is made of a substantially cubical element that fits into a space formed by the abutment of three frame edges. The tongue elements of the wall/floor panels and the frame elements are of substantially the same size and configuration. The slots of the wall/floor panels and the frame elements are of substantially the same size and configuration to receive the tongue elements. The modular safe room can be assembled in various sizes and shapes by attaching the wall/floor panels as desired by the owner.

A notch is formed in the edge of each wall/floor panel and frame element adjacent to each side of each slot. The notch provides the ability of the wall/floor panel and the frame element to deform for insertion of the tongue element into the slot.

The tongue element comprises an end distal from the edge of the wall/floor panel or frame element to which it is attached. The tongue element comprises a lip extending on opposing sides between the distal end and the edge of the wall/floor panel or frame element to which the tongue element is attached. The notch provides sufficient deformation of the wall/floor panel or frame element to allow insertion of the lip of the tongue element. Once the tongue element including the lip is inserted into the slot, the wall/floor panel and frame element returns to its original condition, whereby the lip prevents the tongue element from being removed from the slot.

To attach two wall/floor panels to form walls, a floor and a ceiling, a tongue element of a first wall/floor panel is inserted into the slot of an adjacent wall/floor panel and vice versa, thus forming planar walls, floor and ceiling. The modular safe room is then assembled by connecting the assembled walls, floor and ceiling using the frame elements. In one exemplary method, the assembled floor is placed on the ground. Cubic corner pieces are placed at each corner of the assembled floor. Thereafter, a frame element for each individual wall/floor panel is attached to the assembled floor wherein tongue elements of the attachment edges of frame elements are inserted into the slots of adjacent wall/floor panels of the assembled floor, and vice versa. An assembled wall is then attached to the frame elements that were attached to the assembled floor in the same manner, wherein the remaining available tongue elements of the attachment edges of frame elements are inserted into the slots of adjacent wall/floor panels of the assembled wall, and vice versa. Due to the right-angle configuration of the frame elements, the wall is thus attached at a right angle to the assembled floor. The cubic corner piece provides support in the corner once assembled in this manner. This pattern of attachment is followed to attach the remaining assembled walls to the assembled floor. To attach the ceiling, four cubic corner pieces are placed at the top corners of the attached assembled walls and frame elements are attached to the top edges of the assembled walls. The assembled ceiling is then attached to the frame elements, thus forming the modular safe room.

In one embodiment, each wall/floor panel is made from the assembly of two sections that each comprise a section inner surface and a section outer surface. The section inner surface comprises a plurality of support pieces.

In one embodiment, each frame edge is manufactured from the assembly of three sections.

In one embodiment, the various components making up the wall/floor panels and the frame edges are sonically welded together.

According to one embodiment of the invention, the modular safe room comprises one or more air vents. In one embodiment, the modular safe room comprises an electricity source. In one embodiment, the electricity source comprises a battery. In one embodiment, the electricity source comprises a generator. In one embodiment, air circulation within the modular safe room is provided by a fan. In one embodiment, the modular safe room comprises a light source. In one embodiment, the light source comprises a light bulb. In one embodiment, the modular safe room comprises one or more doors for entrance and egress. In one embodiment, one or more air vents are disposed in a door.

In one embodiment, the wall/floor panels have a dimension of 1 ft.×1 ft. In one embodiment, the wall/floor panels have a dimension of 2 ft.×2 ft. In one embodiment, the wall/floor panels are manufactured from nylon. In one embodiment, the wall/floor panels are manufactured from ABS blends with glass. In one embodiment, the wall/floor panels are manufactured from polycarbonate blends. Any other material that provides sufficient structural strength combined with flexibility to deform and return to initial configuration upon insertion of the tongue elements into the slots can be used as will be known to those skilled in the art.

Figure 1A:
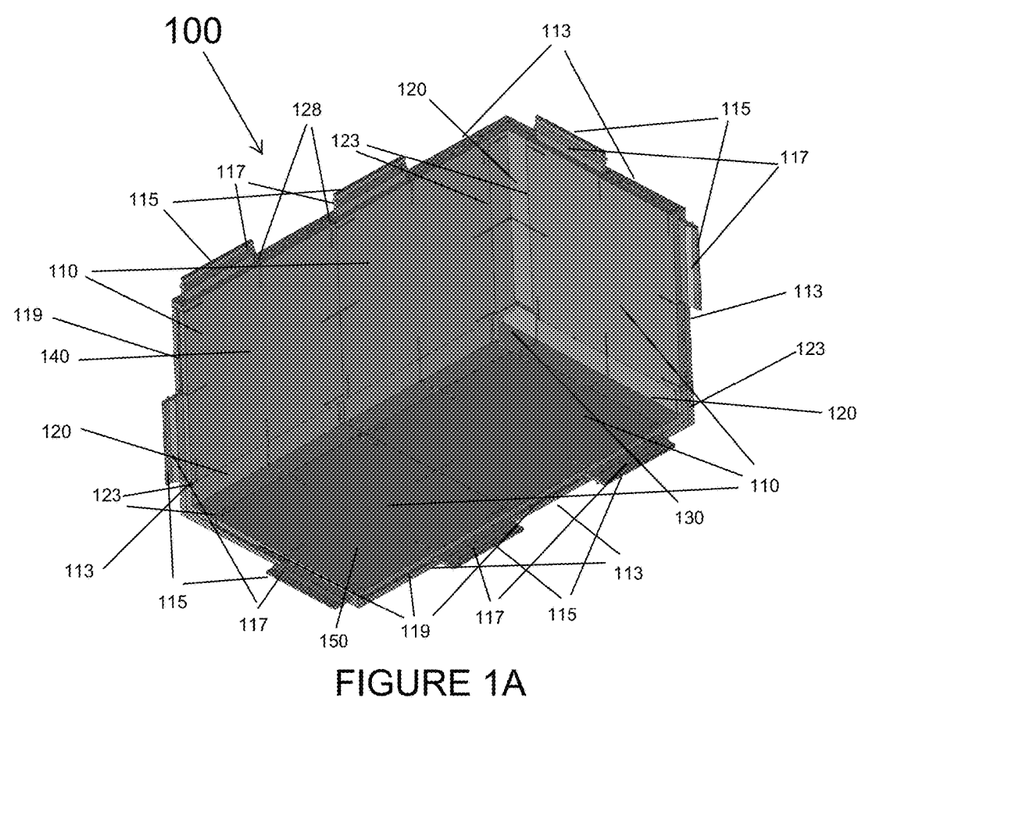
FIG. 1A is a perspective view of one embodiment of the modular safe room according to one embodiment of the invention in its assembled condition.

Turning to the figures, FIG. 1A provides a perspective view of one embodiment of the modular safe room 100 according to one embodiment of the invention in its assembled condition. Modular safe room 100 comprises a plurality of wall/floor panels 110, wherein the edge 113 of each wall/floor panel 110 comprises a tongue element 115; a lip 117; and a slot 119. Modular safe room 100 further comprises a plurality of frame elements 120 each comprising two attachment edges 123, wherein each attachment edge 123 comprises a tongue element (not shown); a lip (not shown); and a slot (not shown) of identical configuration and size to the tongue element 115; lip 117; and slot 119 attached to the edges 113 of each wall/floor panel 110. Each wall/floor panel 110 and frame element 120 further comprises two notches 128 on either side of slots 119. Modular safe room 100 further comprises a plurality of corner pieces 130. In assembled condition, modular safe room 100 comprises a plurality of walls 140 and a floor 150 made of one or more wall/floor panels 110. Modular safe room 100 may further comprise a ceiling according to one embodiment of the invention not shown that is attached in a similar manner to the floor 150.

Figure 1B:
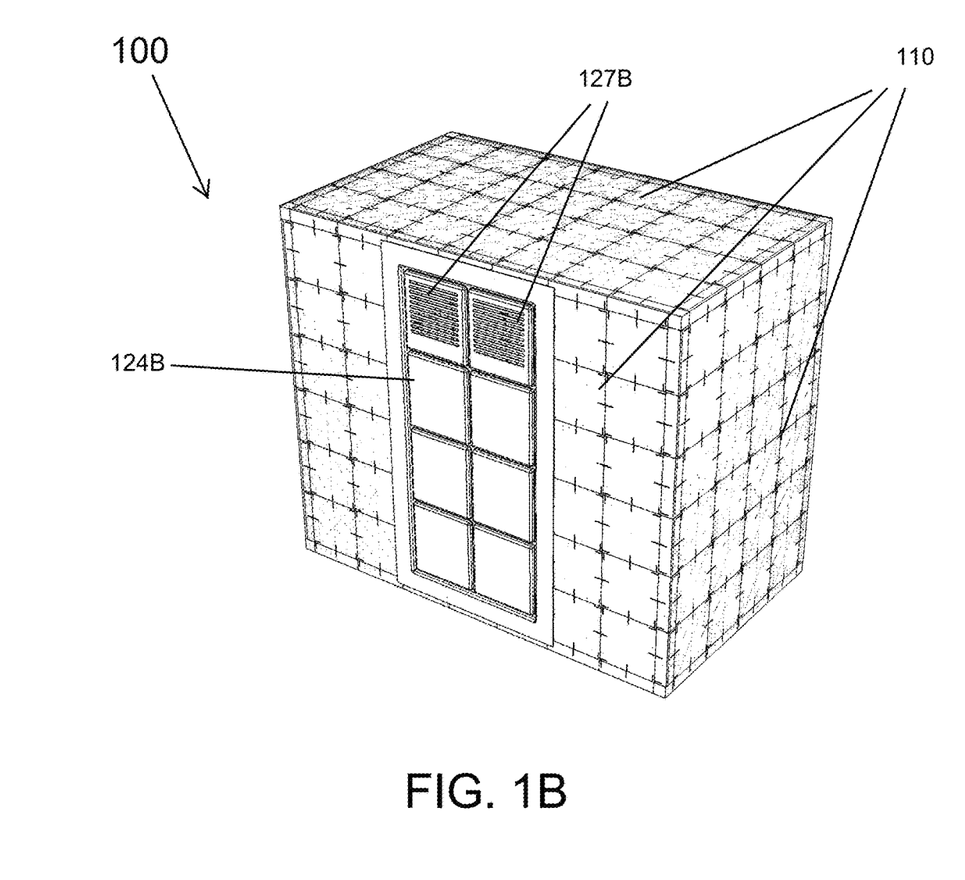
FIGS. 1B and 1C are perspective views of one embodiment of the modular safe room according to one embodiment of the invention in its assembled condition and having a door with one or more vents.
Figure 1C:
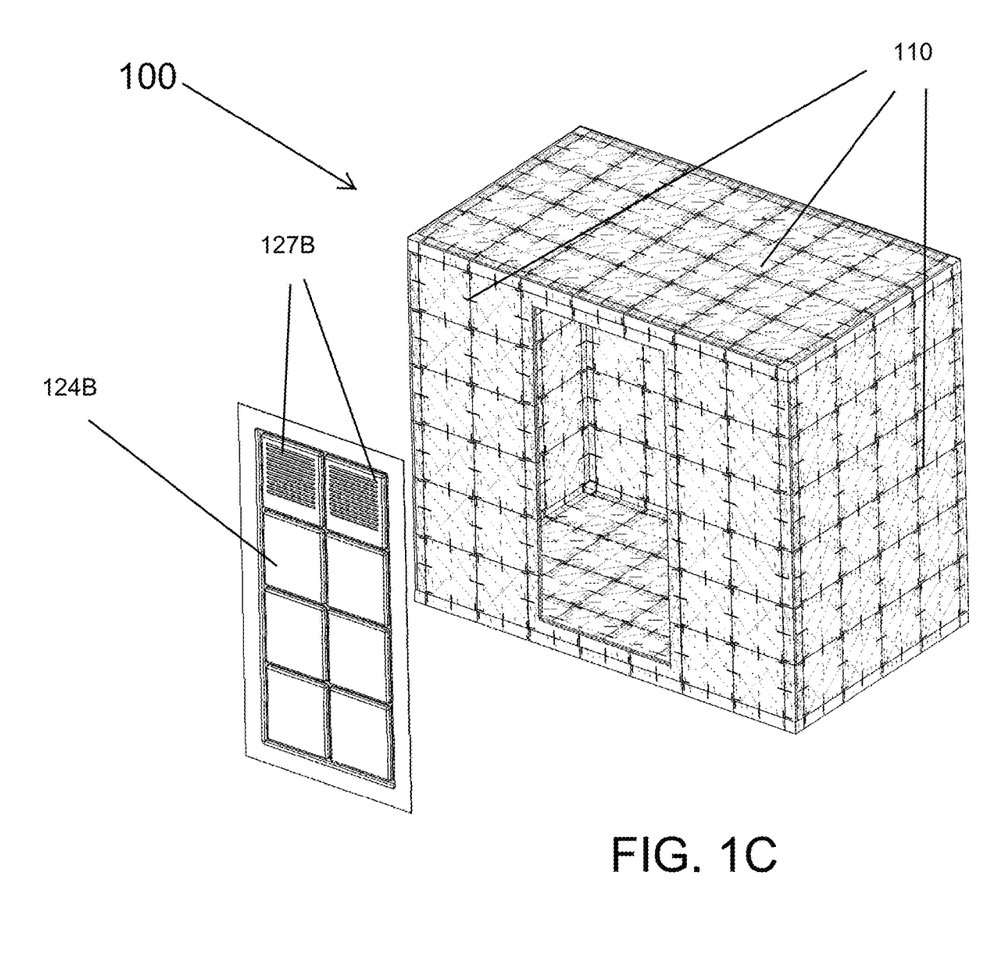

FIGS. 1B and 1C are perspective views of one embodiment of the modular safe room 100 of FIG. 1A having a door 124B with one or more vents 127B. Door 124B can be attached to wall/floor panels 110 by any means now known or later developed. For example, door 124B can be attached to wall/floor panels 110 by way of hinges (not shown).

Figure 1D:
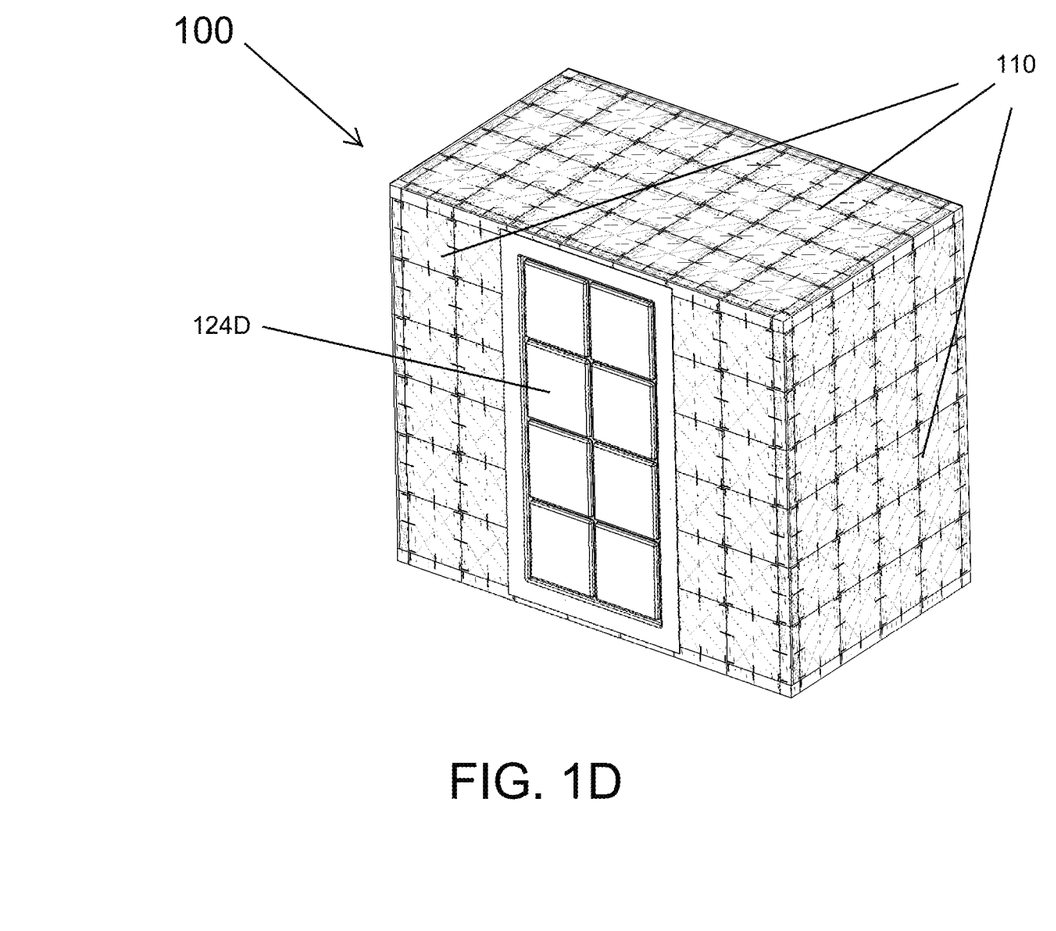
FIGS. 1D and 1E are perspective views of one embodiment of the modular safe room according to one embodiment of the invention in its assembled condition and having a door with no vents.
Figure 1E:
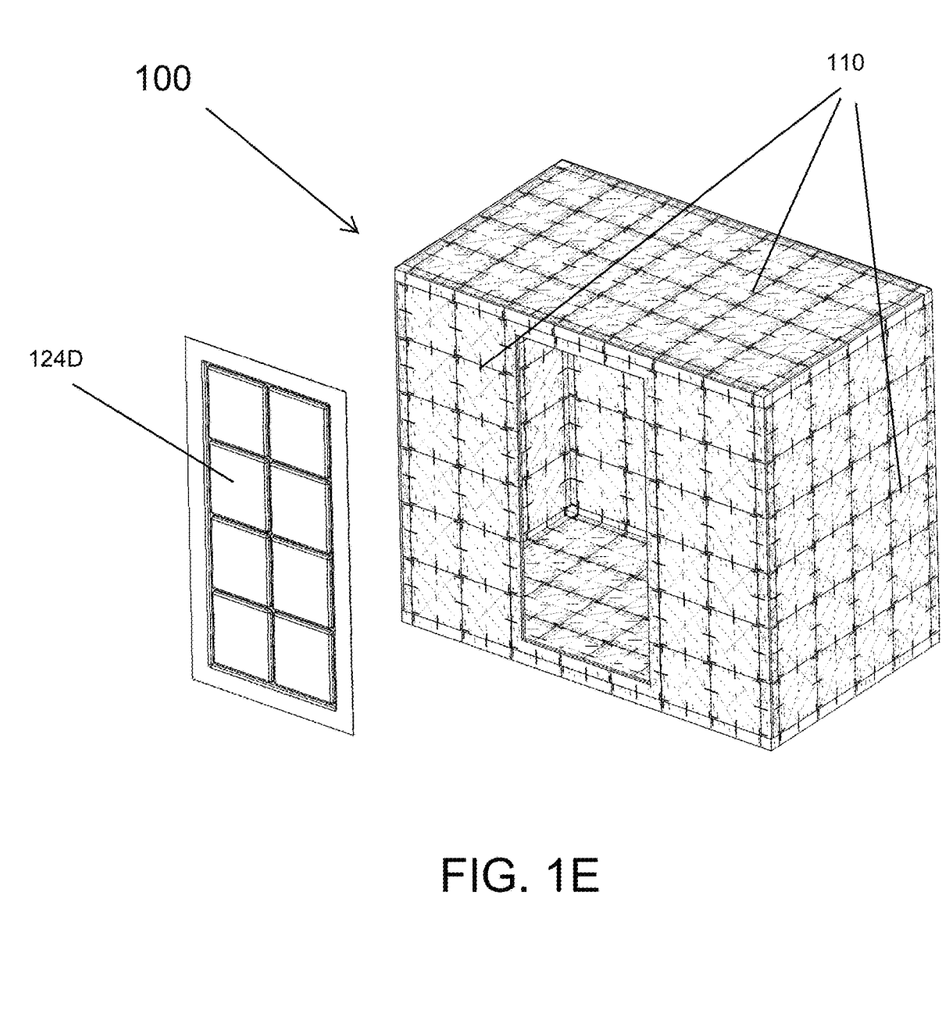

FIGS. 1D and 1E are perspective views of one embodiment of the modular safe room 100 of FIG. 1A having a door 124D with no vents. Door 124D can be attached to wall/floor panels 110 by any means now known or later developed. For example, door 124B can be attached to wall/floor panels 110 by way of hinges (not shown).

Figure 2:
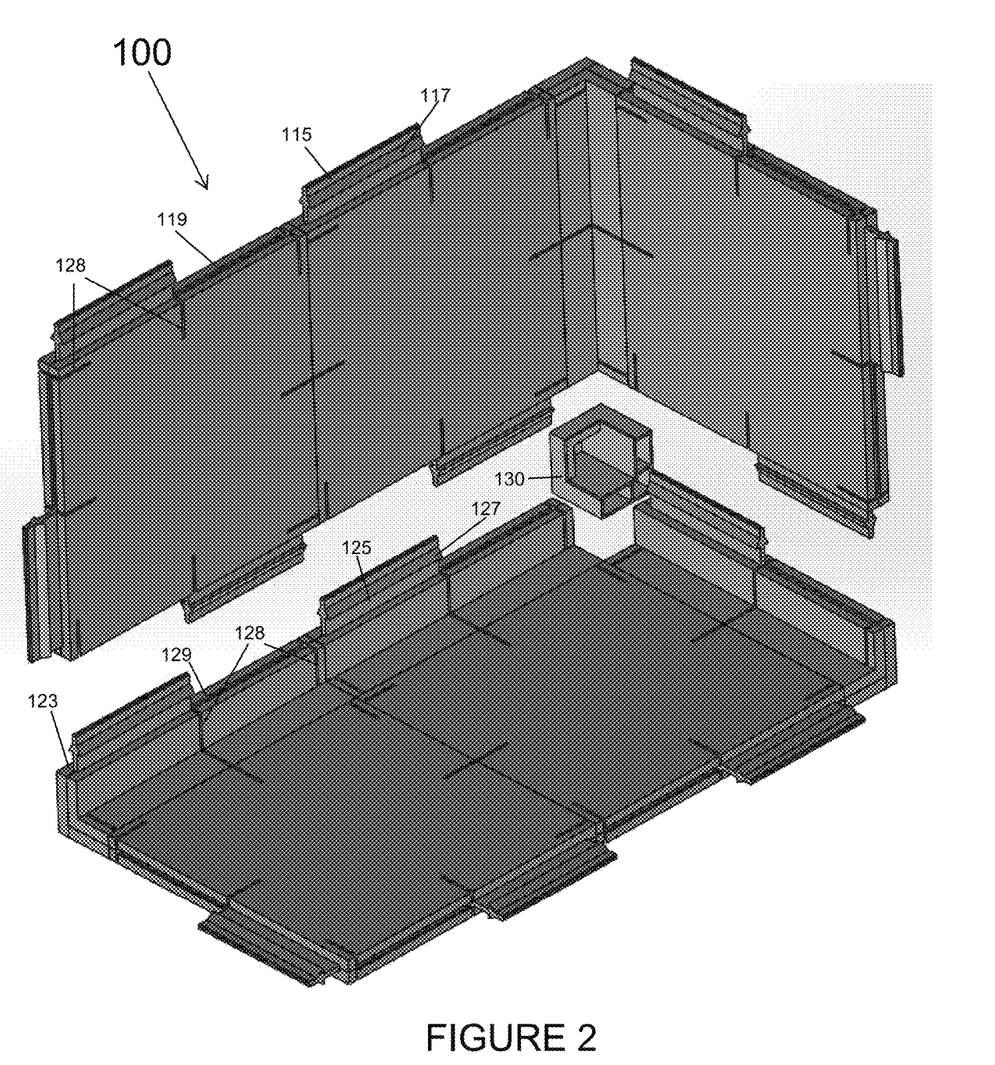
FIG. 2 is a perspective exploded view of the embodiment of the modular safe room according to FIG. 1.

FIG. 2 provides a perspective exploded view of the embodiment of the modular safe room 100 according to FIG. 1 showing a plurality of wall/floor panels 110, edge 113; tongue element 115; lip 117; slot 119; a plurality of frame elements 120; attachment edges 123, abutment edges 124, tongue elements 125; lips 127; slots 129; notches 128; and corner pieces 130.

Figure 3A:
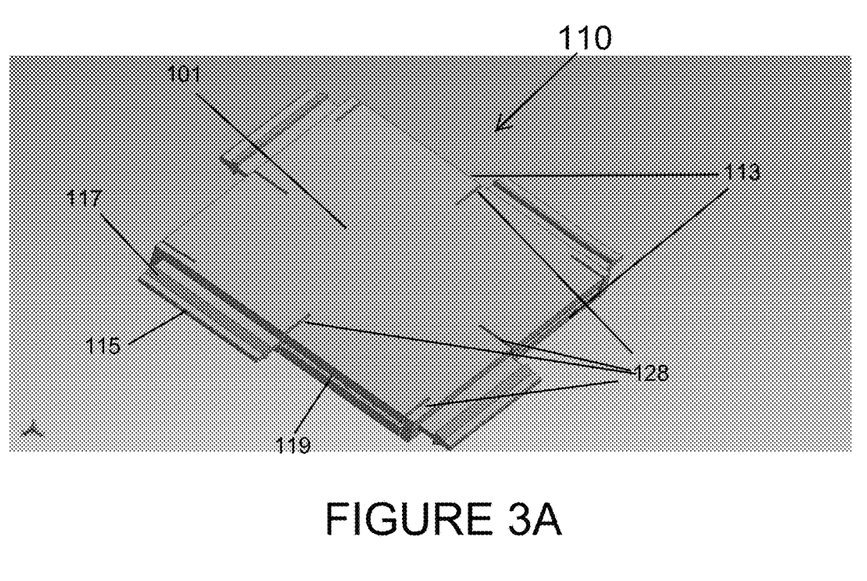
FIG. 3A is a perspective view of a wall/floor panel according to one embodiment of the invention.

FIG. 3A provides a perspective view of a wall/floor panel 110 according to one embodiment of the invention showing an outer surface 101; edges 113; tongue elements 115; lips 117; slots 119; and notches 128.

Figure 3B:
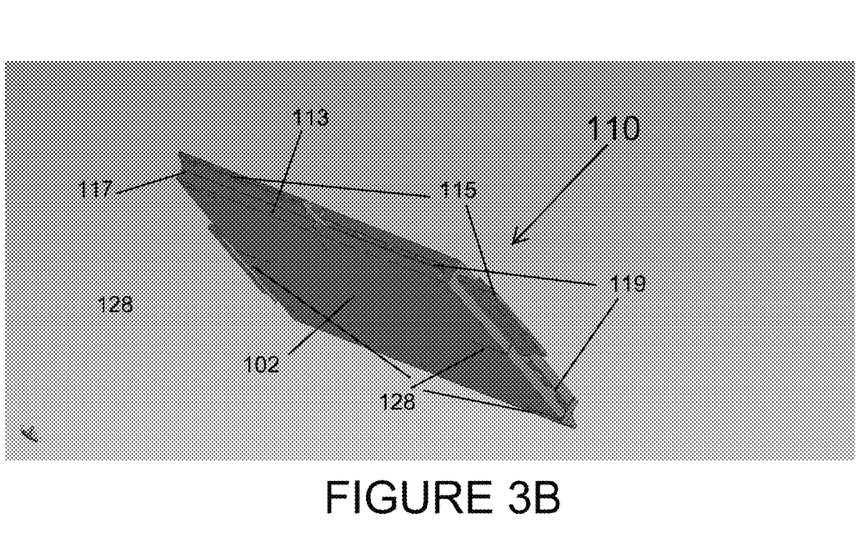
FIG. 3B is a second perspective view of a wall/floor panel according to one embodiment of the invention.

FIG. 3B provides a second perspective view of a wall/floor panel 110 according to one embodiment of the invention showing an inner surface 102; edges 113; tongue elements 115; lips 117; slots 119; and notches 128.

Figure 3C:
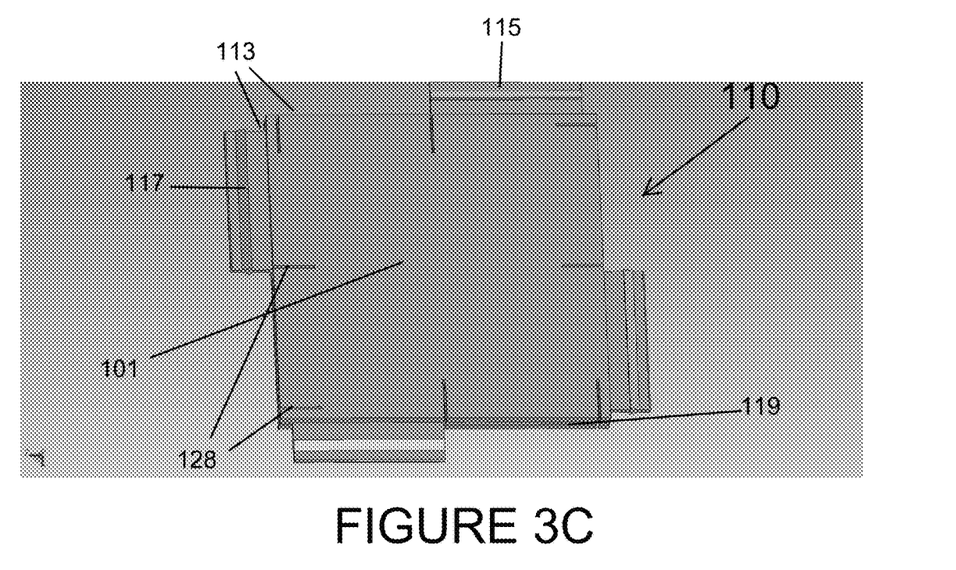
FIG. 3C is a front view of a wall/floor panel according to one embodiment of the invention.

FIG. 3C provides a showing an outer surface 101; edges 113; tongue elements 115; lips 117; slots 119; and notches 128.

Figure 3D:
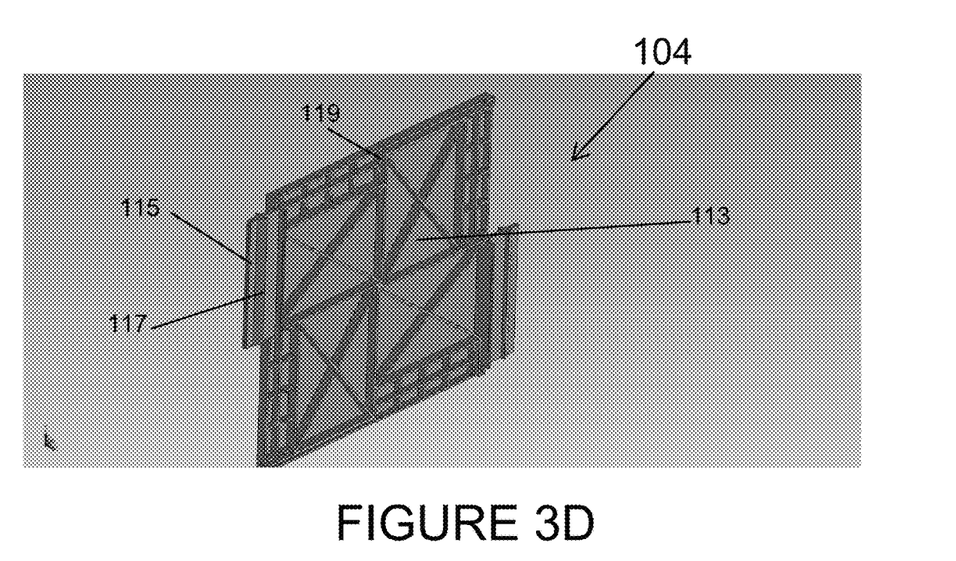
FIG. 3D is a front perspective view of the interior of a section of a wall/floor panel according to one embodiment of the invention.

FIG. 3D provides a front perspective view of the interior of a section 104 of a wall/floor panel 110 showing edges 113; tongue elements 115; and lips 117; slots 119 and notches 128.

Figure 4:
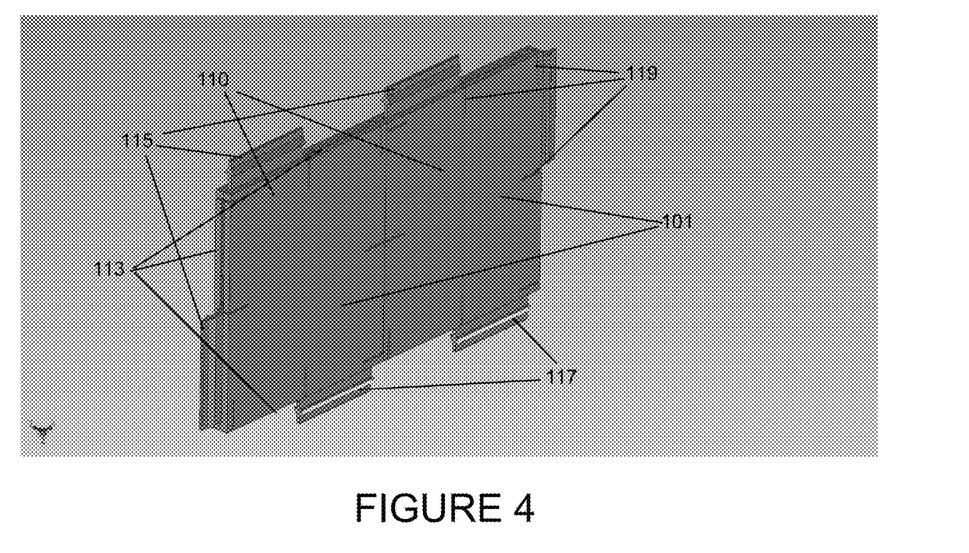
FIG. 4 is a front perspective view of two attached wall/floor panels according to one embodiment of the invention.

FIG. 4 provides a front perspective view of two attached wall/floor panels 110 showing outer surfaces 101; edges 113; tongue elements 115; lips 117; and slots 119.

Figure 5A:
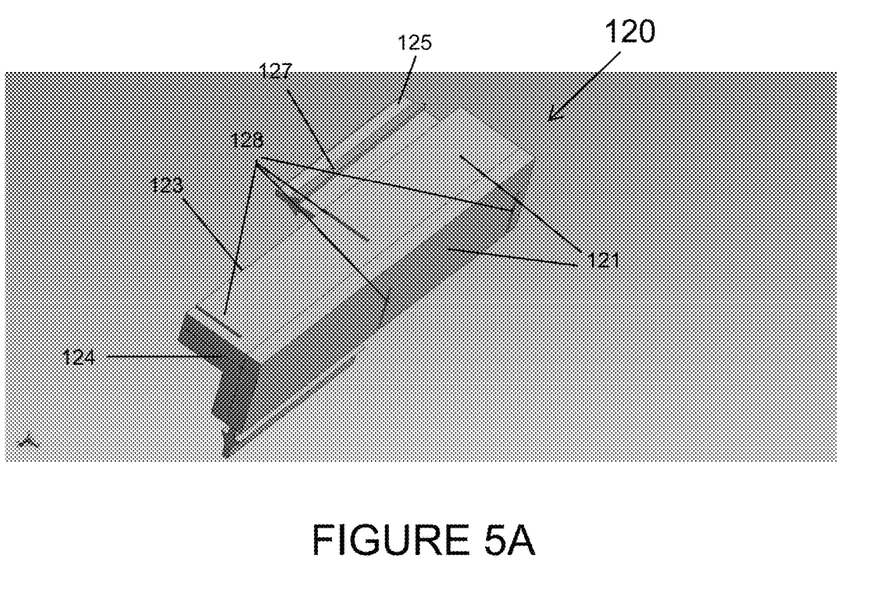
FIG. 5A is a perspective view of a first element of a frame element according to one embodiment of the invention.

FIG. 5A provides a perspective view of a frame element 120 according to one embodiment of the invention showing outer surfaces 121, attachment edges 123, abutment edges 124, tongue elements 125, lips 127 and notches 128.

Figure 5B:
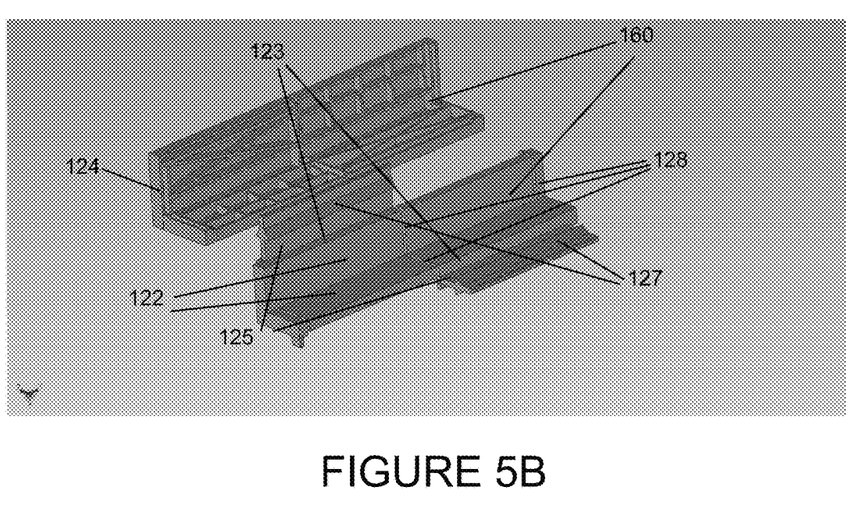
FIG. 5B is a perspective view of a frame element according to one embodiment of the invention in assembled condition.

FIG. 5B provides an exploded perspective view of two sections 160 that are used to form a frame element 120 according to one embodiment of the invention showing inner surfaces 122, attachment edges 123, abutment edges 124, tongue elements 125, lips 127 and notches 128. Also shown are the interior of the sections 160 with support elements 165.

Figure 6:
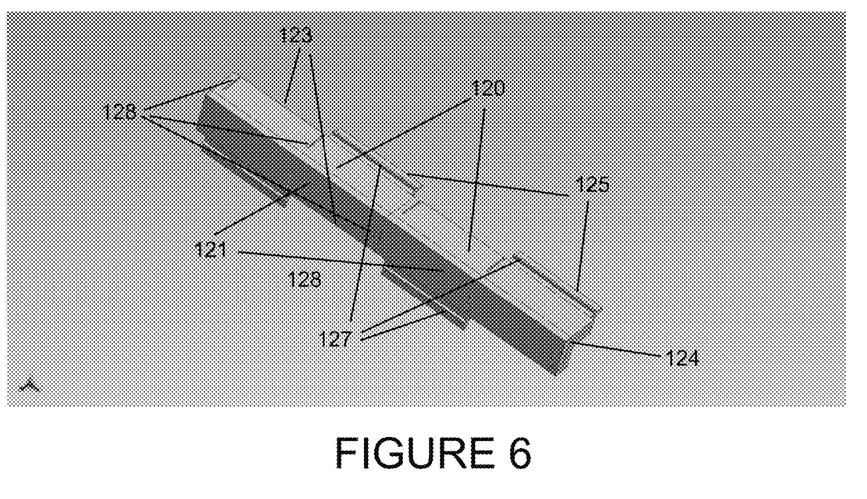
FIG. 6 is a front perspective view of two attached frame elements according to one embodiment of the invention.

FIG. 6 provides a front perspective view of two attached frame elements 120 according to one embodiment of the invention showing outer surfaces 121, attachment edges 123, abutment edges 124, tongue elements 125, lips 127, slots 129 and notches 128.

Figure 7A:
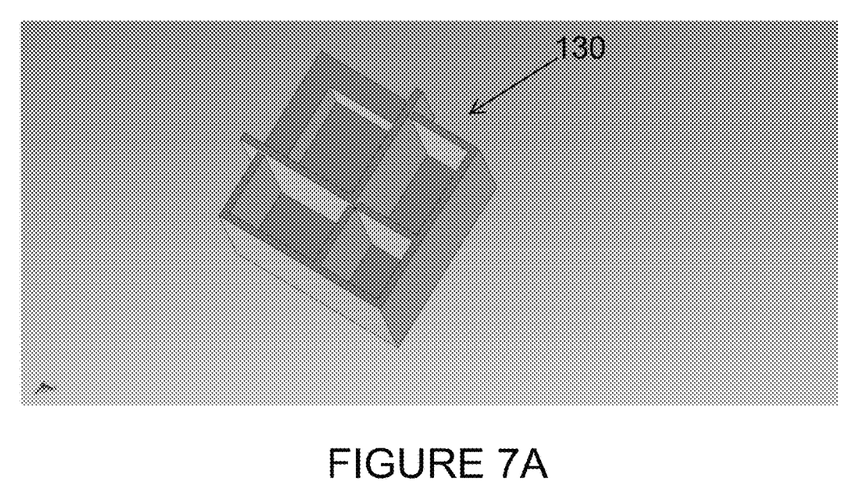
FIG. 7A is a top view of a corner piece according to one embodiment of the invention.

FIG. 7A provides a top view of a corner piece 130 according to one embodiment of the invention.

Figure 7B:
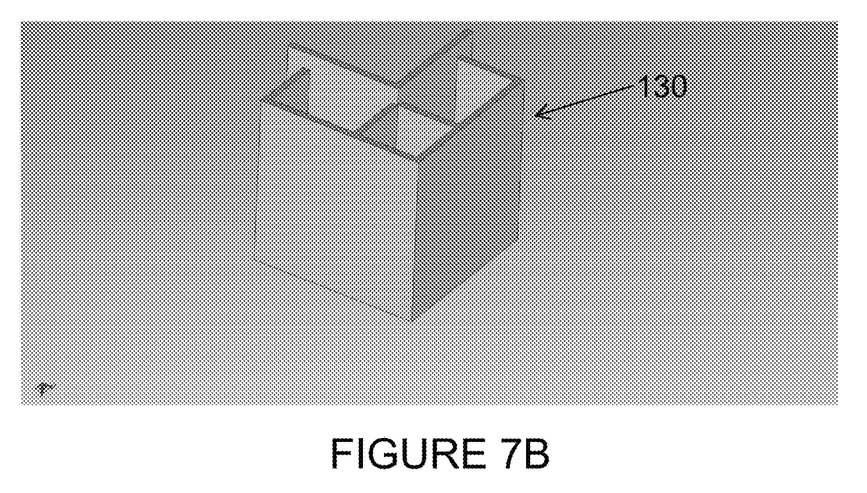
FIG. 7B is a front perspective view of a corner piece according to one embodiment of the invention.

FIG. 7B provides a front perspective view of a corner piece 130 according to one embodiment of the invention.

The foregoing embodiments have been presented for the purpose of illustration and description only and are not to be construed as limiting the scope of the invention in any way. While the invention has been described in the terms of a modular safe room, the inventive concepts can be applied to other constructions as would be known to those skilled in the art, such as but not including packing crates and temporary spaces such as dark rooms or video screening rooms. The scope of the invention is to be determined from the claims appended hereto.

What is claimed is:

1. A modular safe room, comprising:
    a plurality of wall/floor panels in connection with each other forming four walls and a floor, wherein each wall/floor panel comprises a wall/floor panel inner surface, a wall/floor panel outer surface and four wall/floor panel edges defined by the distance between the wall/floor panel inner surface and the wall/floor panel outer surface, wherein each of the four walls and the floor comprise after connection four exposed wall/floor panel edges;
    a plurality of frame elements attached to the exposed wall/floor panel edges of the four walls and floor, wherein each frame element comprises a first element and a second element disposed at a 90 degree angle to each other, a first element inner surface and a second element outer surface, a first element attachment edge, a second element attachment edge, two first element abutment edges and two second element abutment edges; and
    a plurality of cubic corner pieces disposed at each of the corners where the walls meet the floor,
    wherein each wall/floor panel edge, first element attachment edge and second element attachment edge comprises a tongue element extending outwardly and a slot adjacent each tongue element,
    wherein each tongue element comprises two lips extending from opposite edges of the tongue element, wherein the tongue elements and slots are substantially identical to each other,
    wherein the tongue elements and slots of the frame edges are attached to the tongue elements and slots of the exposed wall/floor panel edges of the four walls and floor by insertion of the tongue elements into the slots on the exposed wall/floor panel edges of the four walls and the floor.

2. The modular safe room of claim 1, wherein each wall/floor panel is constructed from two sections.

3. The modular safe room of claim 2, wherein the frame elements are constructed from two sections.

4. The modular safe room of claim 3, wherein the sections are sonically welded.

5. The modular safe room of claim 1, comprising nylon.

6. The modular safe room of claim 1, comprising ABS blends with glass.

7. The modular safe room of claim 1, comprising polycarbonate blends.

8. The modular safe room of claim 1, further comprising a ceiling.

9. The modular safe room of claim 1, further comprising an ingress and egress element.

10. The modular safe room of claim 9, wherein the ingress and egress element comprises a door.

11. The modular safe room of claim 10, wherein the door comprises at least one air vent.

12. The modular safe room of claim 1, further comprising a plurality of air vents.

13. The modular safe room of claim 1, further comprising a source of power.

14. The modular safe room of claim 13, wherein the source of power comprises a battery.

15. The modular safe room of claim 13, wherein the source of power comprises a generator.

16. The modular safe room of claim 13, further comprising a ventilation apparatus.

17. The modular safe room of claim 16, wherein the ventilation apparatus comprises a fan.

* * * * *